US008855849B1

(12) United States Patent
Ferguson et al.

(10) Patent No.: US 8,855,849 B1
(45) Date of Patent: Oct. 7, 2014

(54) OBJECT DETECTION BASED ON KNOWN STRUCTURES OF AN ENVIRONMENT OF AN AUTONOMOUS VEHICLE

(71) Applicants: David I. Ferguson, San Francisco, CA (US); Abhijit Ogale, Mountain View, CA (US)

(72) Inventors: David I. Ferguson, San Francisco, CA (US); Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/775,554

(22) Filed: Feb. 25, 2013

(51) Int. Cl.
*G05D 1/00* (2006.01)
(52) U.S. Cl.
CPC ........................................ *G05D 1/00* (2013.01)
USPC ............................................................ 701/28
(58) Field of Classification Search
USPC ............................................................ 701/28
See application file for complete search history.

(56) References Cited

U.S. PATENT DOCUMENTS

| | | | | |
|---|---|---|---|---|
| 5,842,194 A * | 11/1998 | Arbuckle | | 706/52 |
| 6,873,912 B2 * | 3/2005 | Shimomura | | 701/301 |
| 7,542,835 B2 * | 6/2009 | Takahama et al. | | 701/45 |
| 7,639,841 B2 * | 12/2009 | Zhu et al. | | 382/104 |
| 8,131,018 B2 | 3/2012 | Wilson | | |
| 8,289,142 B2 | 10/2012 | Pawlicki et al. | | |
| 8,611,585 B2 * | 12/2013 | Zhang et al. | | 382/100 |
| 2008/0002855 A1 * | 1/2008 | Rai et al. | | 382/103 |
| 2009/0153659 A1 * | 6/2009 | Landwehr et al. | | 348/135 |
| 2010/0100268 A1 * | 4/2010 | Zhang et al. | | 701/25 |
| 2010/0121577 A1 * | 5/2010 | Zhang et al. | | 701/301 |
| 2011/0244919 A1 * | 10/2011 | Aller et al. | | 455/556.1 |
| 2012/0021386 A1 | 1/2012 | Anderson et al. | | |

\* cited by examiner

*Primary Examiner* — Thomas Tarcza
*Assistant Examiner* — Alex C Dunn
(74) *Attorney, Agent, or Firm* — McDonnell Boehnen Hulbert & Berghoff LLP

(57) ABSTRACT

An autonomous vehicle may be configured to detect objects based on known structures of an environment. The vehicle may be configured to obtain image data from a sensor and be configured to operate in an autonomous mode. The image data may include data indicative of a known structure in the environment. The vehicle may include a computer system. The computer system may determine, based on a first portion of the image data, information indicative of an appearance of the known structure. The computer system may determine, based on a second portion of the image data, information indicative of an appearance of an unknown object in the environment. The computer system may also compare the information indicative of the appearance of the known structure with the information indicative of the appearance of the unknown object and provide instructions to control the vehicle in the autonomous mode based on the comparison.

20 Claims, 11 Drawing Sheets

US 8,855,849 B1

OBJECT DETECTION BASED ON KNOWN STRUCTURES OF AN ENVIRONMENT OF AN AUTONOMOUS VEHICLE

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

Within examples, methods and systems are provided for object detection based on known structures of an environment for an autonomous vehicle.

In a first aspect, a method is provided. The method includes obtaining, using a processor, image data from at least one sensor of a vehicle configured to operate in an autonomous mode in an environment. The at least one sensor is coupled to the vehicle, and the image data includes data indicative of a known structure in the environment that the vehicle is traveling on. The method also includes determining, based on a first portion of the image data, information indicative of an appearance of the known structure. The method additionally includes determining, based on a second portion of the image data, information indicative of an appearance of an unknown object in the environment. The second portion of the image data is different than the first portion of the image data. The method further includes comparing the information indicative of the appearance of the known structure with the information indicative of the appearance of the unknown object in the environment so as to determine whether the information indicative of the appearance of the known structure in the environment and the information indicative of the appearance of the unknown object is representative of the same object. The method further includes providing instructions to control the vehicle in the autonomous mode based on the comparison.

In a second aspect, a vehicle is provided. The vehicle includes a sensor configured to obtain image data in an environment. The image data includes data indicative of a known structure in the environment that the vehicle is traveling on, and the vehicle is configured to operate in an autonomous mode in the environment. The vehicle also includes a computer system. The computer system is configured to determine, based on a first portion of the image data, information indicative of an appearance of the known structure. The computer system is also configured to determine, based on a second portion of the image data, information indicative of an appearance of an unknown object in the environment. The second portion of the image data is different than the first portion of the image data. The computer system is additionally configured to compare the information indicative of the appearance of the known structure in the environment with the information indicative of the appearance of the unknown object in the environment so as to determine whether the information indicative of the appearance of the known structure and the information indicative of the appearance of the unknown object is representative of the same object. The computer system is further configured to provide instructions to control the vehicle in the autonomous mode based on the comparison.

In a third aspect, a non-transitory computer readable medium having stored therein instructions executable by a computer system in a vehicle is provided. The instructions include obtaining image data from at least one sensor of a vehicle configured to operate in an autonomous mode in an environment. The at least one sensor is coupled to the vehicle, and the image data includes data indicative of a known structure in the environment that the vehicle is traveling on. The instructions also include determining, based on a first portion of the image data, information indicative of an appearance of the known structure. The instructions additionally include determining, based on a second portion of the image data, information indicative of an appearance of an unknown object in the environment. The second portion of the image data is different than the first portion of the image data. The instructions further include comparing the information indicative of the appearance of the known structure in the environment with the information indicative of the appearance of the unknown object in the environment so as to determine whether the information indicative of the appearance of the known structure and the information indicative of the appearance of the unknown object is representative of the same object. The instructions further include providing instructions to control the vehicle in the autonomous mode based on the comparison.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
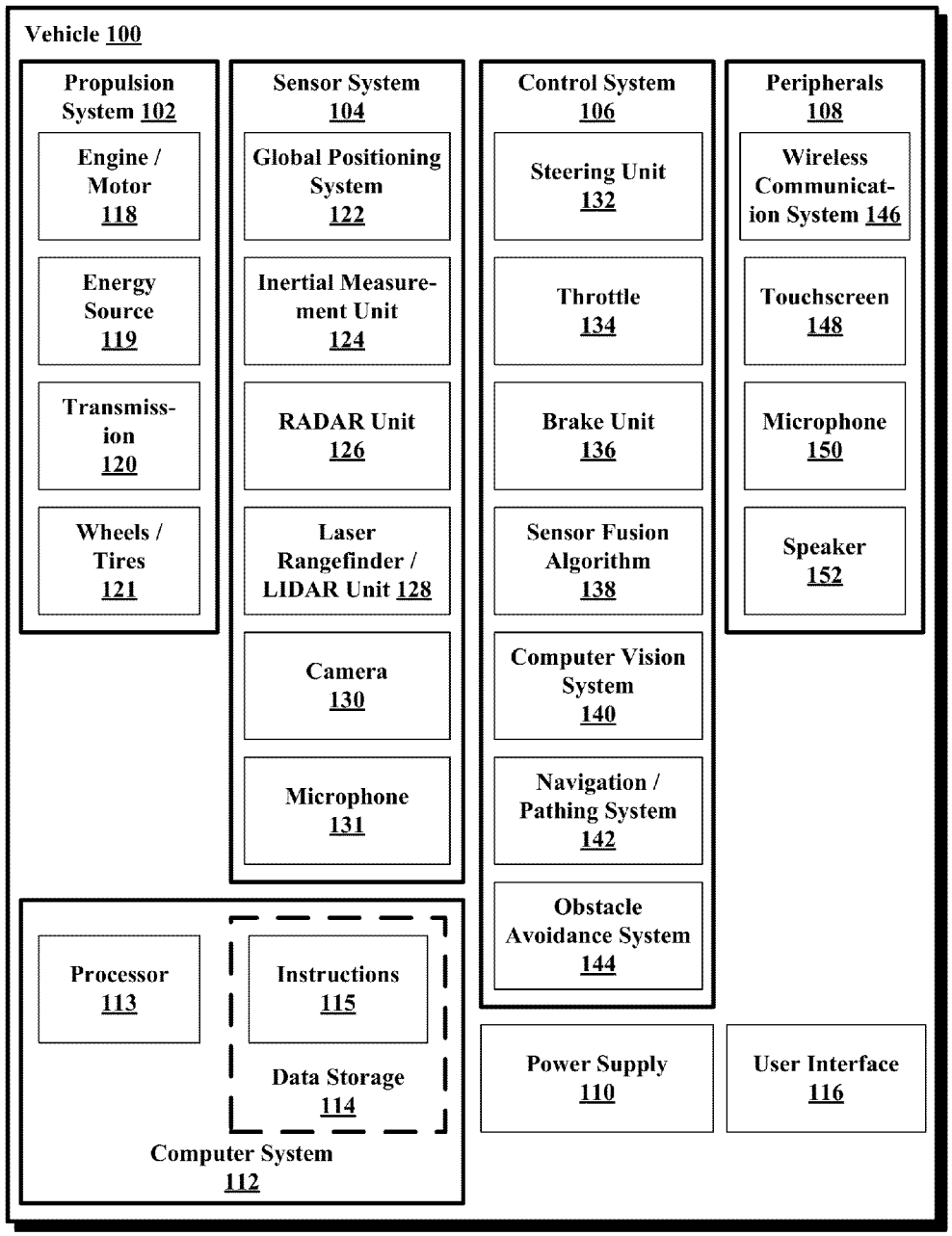
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, knowing or recognizing the presence of objects in a current lane of the vehicle may be helpful. Generally, to detect the presence of objects, autonomous vehicles may utilize various sensors including LIDAR and RADAR. However, detecting objects at a long range may be challenging for autonomous vehicles, and both LIDAR and RADAR each have limitations. For example, RADAR may be configured only to detect metal objects and may have trouble accurately detecting objects that may not be moving, such as a stopped car. In addition, LIDAR may not have the range to detect objects at certain distances within time constraints to allow the autonomous vehicle operating the LIDAR to stop.

In other examples, cameras may be used to detect the presence of objects. Cameras provide an alternative to LIDAR and RADAR as they are configured to observe objects at long ranges and may be configured not to differentiate between metallic and non-metallic objects. However, processing camera images may be more challenging than processing LIDAR or RADAR data because objects may be different or may take different appearances depending on, for example, lighting conditions, a presence of shadows, color differences, etc.

Within examples, an autonomous vehicle is provided that is configured to utilize the nature of an environment of the autonomous vehicle for image processing. Accordingly, disclosed herein are methods and systems that relate to an autonomous vehicle detecting objects using known structures in an environment. More particularly, disclosed embodiments relate to a vehicle that may operate in an autonomous mode and may capture image data of a particular region of an environment in which the vehicle is operating. The image data may include information that defines an appearance of a known structure in the environment on which the vehicle is traveling. The vehicle may use the information to help determine other areas in the image data that are not likely relevant and to help detect objects within relevant areas, by comparing the portions of the image data representing appearances of the known structure to other portions of the image data, or to other image data altogether (e.g., image data obtained later in time). Accordingly, the methods and systems described herein may facilitate the task of image processing in an autonomous vehicle, possibly avoiding some of the difficulties that may be present in more typical camera processing approaches.

For example, an autonomous vehicle may obtain an image while the vehicle is traveling along a road, and the vehicle may also be aware of where the road and lanes are relative to itself. The autonomous vehicle may process the image and may compute statistics on the portion of the image known to represent the current road/lane and use those statistics to infer which other areas of the image (or areas of other images obtained by the vehicle) are likely to also represent the road. The areas that are not likely to represent the road likely include image data that represents other objects.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
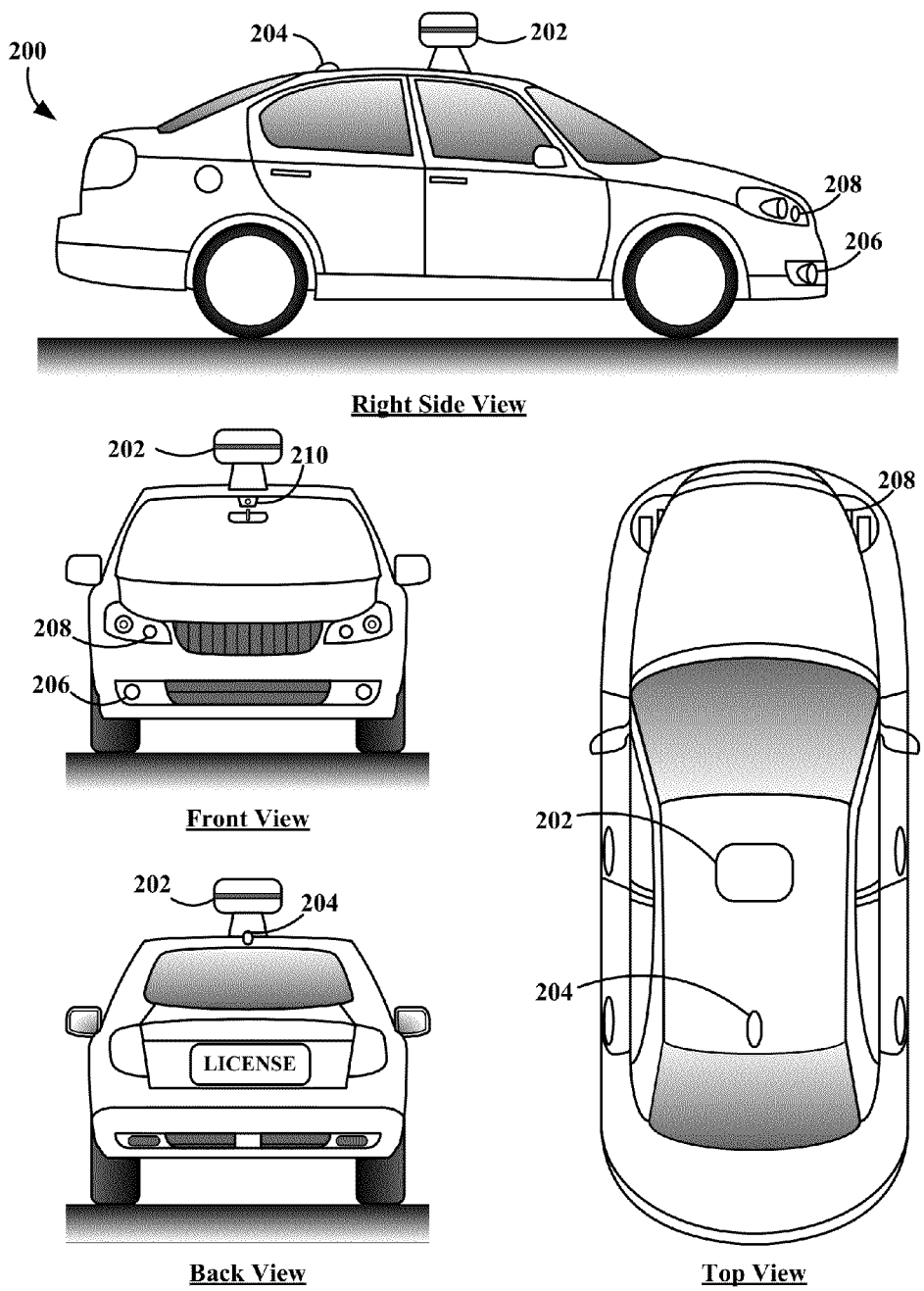
FIG. 2 is a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3A:
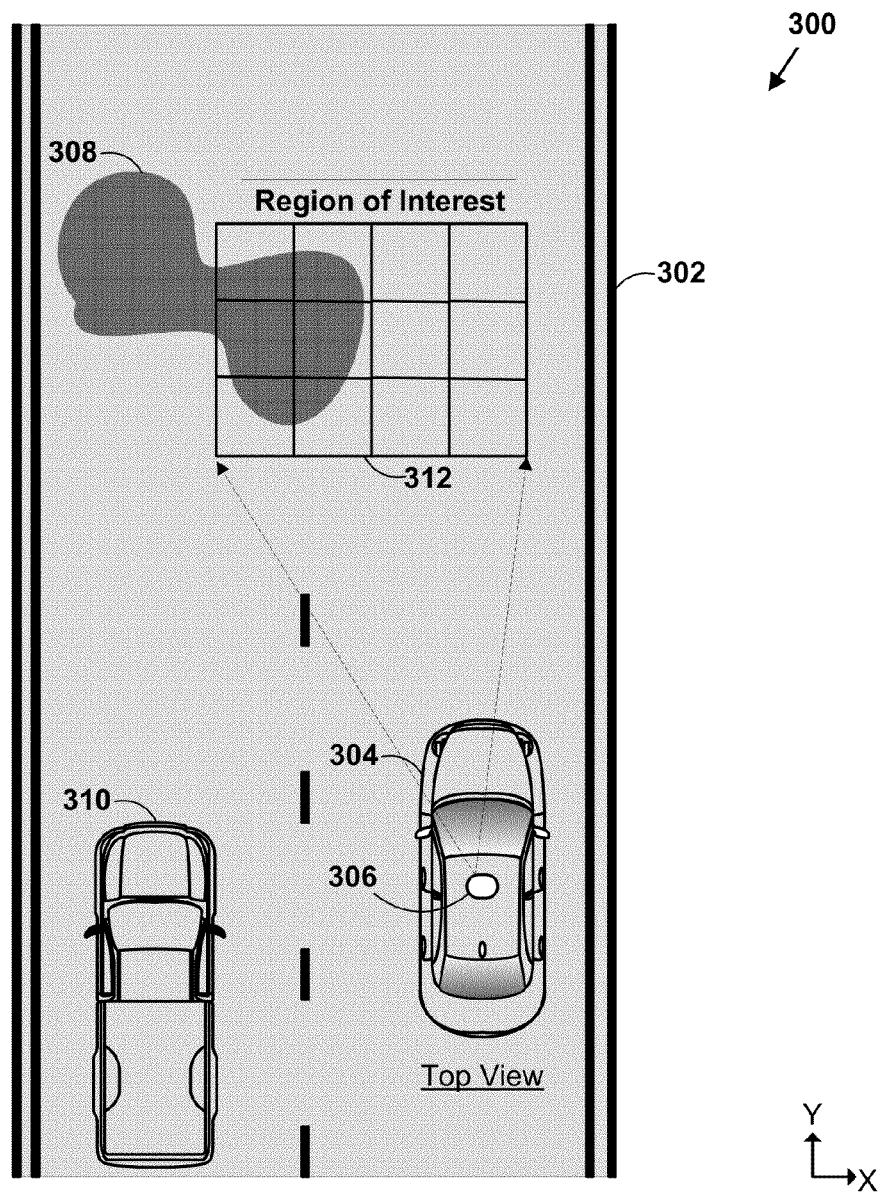
FIG. 3A is a top view of an autonomous vehicle operating scenario, in accordance with an example embodiment.

FIG. 3A illustrates a scenario 300 involving a road 302 (e.g., a freeway) and a vehicle 304 that may operate in an autonomous mode in an environment. In this example, along with vehicle 304 and road 302, the environment may include oil spill 308 and truck 310. However, in other examples, more or less may be included in the environment of vehicle 304. The vehicle 304 may operate at least one sensor of a sensor unit 306 to obtain image data. For example, vehicle 304 may operate a camera, similar to or the same as camera 130, for example, to obtain image data 312 that represents a portion of the environment. In this scenario, image data 312 captured by a camera of sensor unit 306 is represented by the area demarcated by a 3×4 grid square labelled "Region of Interest." The image data may include data indicative of a known structure of the environment that vehicle 304 is traveling on. For example, the known structure may be the road 302. As shown, the "Region of Interest" includes a portion that includes the road 302 on which the vehicle 304 is traveling.

The region of interest may be an area of the environment that the vehicle focuses on based on known characteristics of the environment. The region of interest may comprise an angular region in front of or behind the vehicle or a lateral area to either side of the vehicle. In other examples, the region of interest may be below the vehicle.

Figure 3B:
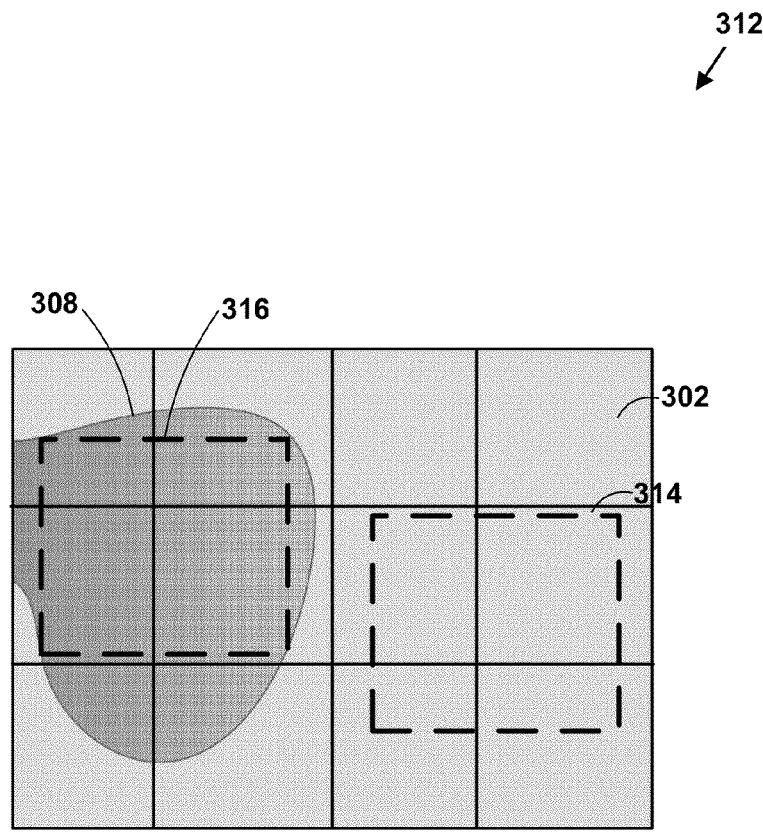
FIG. 3B is a schematic illustration of example image data obtained by the autonomous vehicle of FIG. 3A.

FIG. 3B schematically illustrates enlarged image data 312 corresponding to the image data captured by vehicle 304 in scenario 300. Once the image data has been obtained, vehicle 304 (or a computing device coupled to the vehicle) may determine a first portion of the image data indicative of an appearance of the known structure, and a second portion of the image data indicative of an appearance of an unknown object in the environment. The information indicative of the appearance of the known structure and the unknown object may be any information that helps define the appearance of either such as color, shape, size, texture, lighting, the presence of a shadow on the structure or object, etc. In FIG. 3B, a portion 314 of the image data 312 may include the known structure—or, as noted above, road 302—and a portion 316 of the image data 312 may include an unknown object such as oil spill 308.

Once the information indicative of an appearance of the known structure and the information indicative of the unknown object has been determined, the vehicle 304 may compare the information indicative of the known structure with the information indicative of the appearance of the unknown object to determine whether the information indicative of the appearance of the known structure and the information indicative of appearance of the unknown object is representative of the same. In other words, vehicle 304 may use portions of the image data known to represent the road 302, compute statistics on those portions (discussed in more detail below), and use the statistics to infer which other areas of the image data are likely to also represent road 302. For example, vehicle 304 may compare a color distribution representing portion 316 with a color distribution representing portion 314. Knowing that the color distribution representing portion 314 is of the road 302, vehicle 304 may determine that the portion 316 is not likely to include, and therefore not likely to be road 302.

Based on the comparison, the vehicle 304 may be controlled to operate in the autonomous mode. For example, vehicle 304 may determine that portion 316 of image data 312 does not represent the known road 302. Accordingly, vehicle 304 may be controlled to stay to the right or away from the portion of the environment that includes portion 316, because it is likely the image data represented by portion 316 is not likely road 302, but instead indicative of some other object, or in this scenario oil spill 308.

In some examples, vehicle 304 may maintain a database of information relating to the image data of unknown objects, and as vehicle 304 acquires more information about the unknown object, the unknown object may become known and may be used for image comparison at later times or in different environments.

Figure 3C:
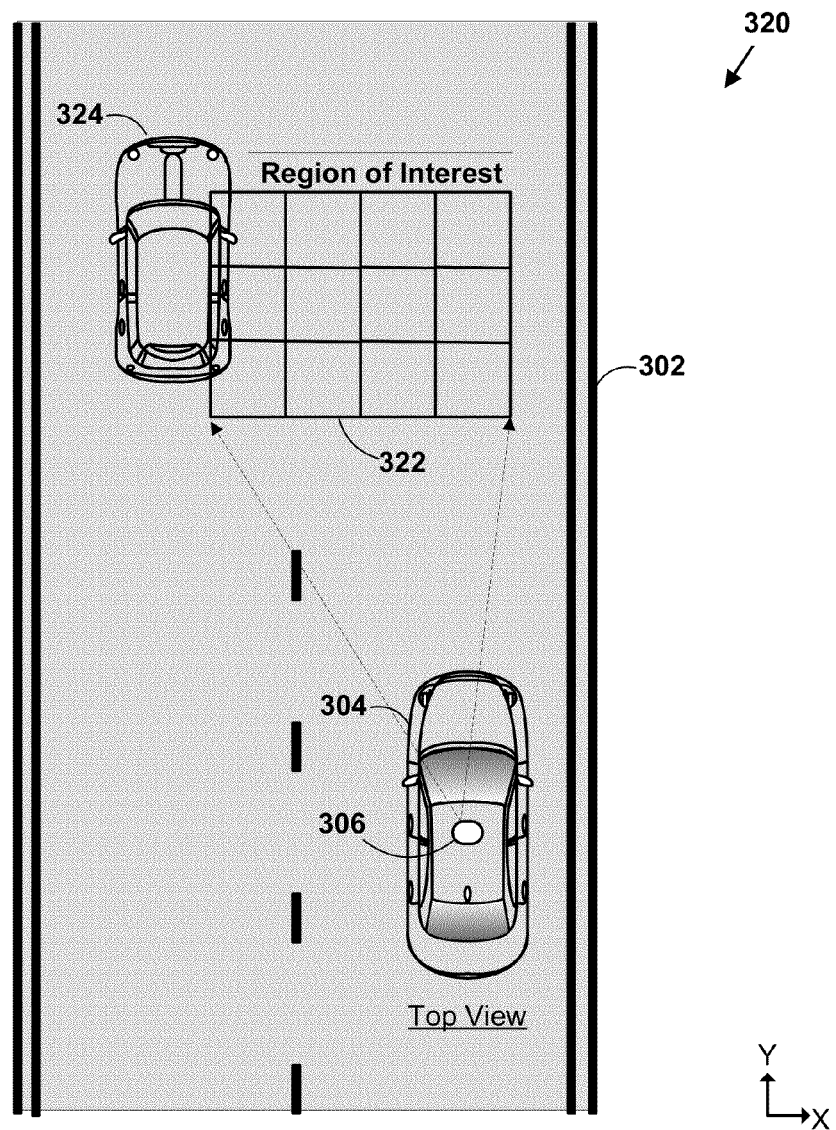
FIG. 3C is another top view of an autonomous vehicle operating scenario, in accordance with an example embodiment.
Figure 3D:
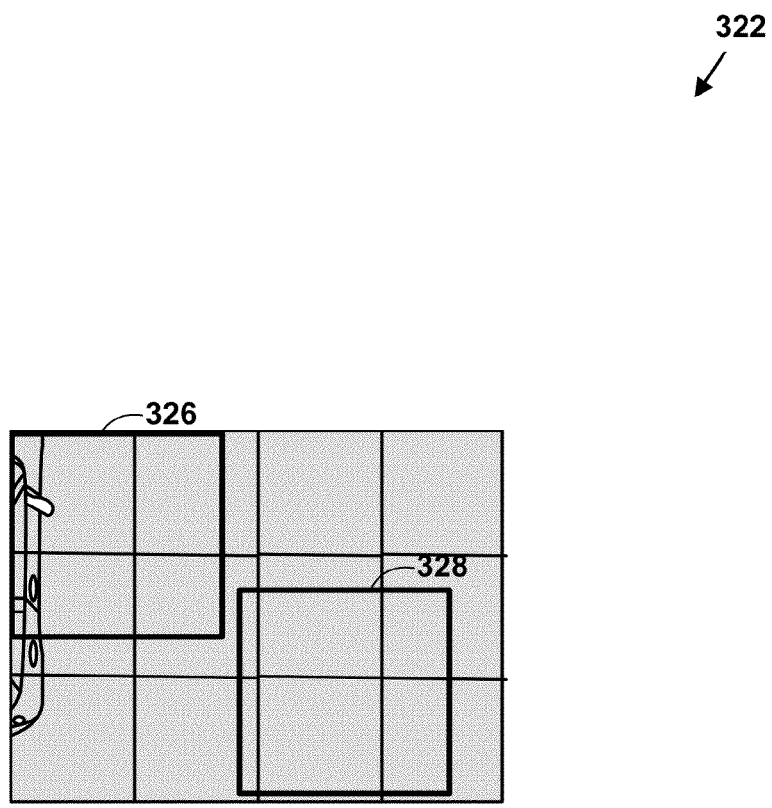
FIG. 3D is a schematic illustration of example image data obtained by the autonomous vehicle of FIG. 3C.

FIG. 3C illustrates a similar scenario 320 to that of FIG. 3A, but in scenario 320 the unknown object 324 may differ in shape, color, and variation of color. In FIG. 3C, along with vehicle 304 and road 302, the environment may include unknown sport utility vehicle (SUV) 324. Similar to scenario 300, in this scenario, vehicle 304 may continue to operate in an autonomous mode and may obtain image data 322 that may include a portion of the road 302 and a portion of unknown object, SUV 324. FIG. 3D illustrates a schematic of image data 322 that may be obtained by vehicle 304.

Vehicle 304 may determine a portion 326 of the image data 322 indicative of the road 302 and a portion 328 of the image data 322 indicative of the unknown SUV 324. Vehicle 304 may compare the information indicative of the appearance of known road 302 with the information indicative of the appearance of unknown SUV 324 to determine whether the information indicative of the appearance of known road 302 with the information indicative of the appearance of unknown SUV 324 is representative of the same. In this scenario, the vehicle may compute statistics on not only the color of portion 326 of image data 322, but may also calculate statistics and/or distributions defining, for example, a shape and variation of color of portion 326 of image data 322. Based on the comparison, the vehicle 304 may be controlled to stay out of the left lane to avoid unknown SUV 324, for example.

Figure 3E:
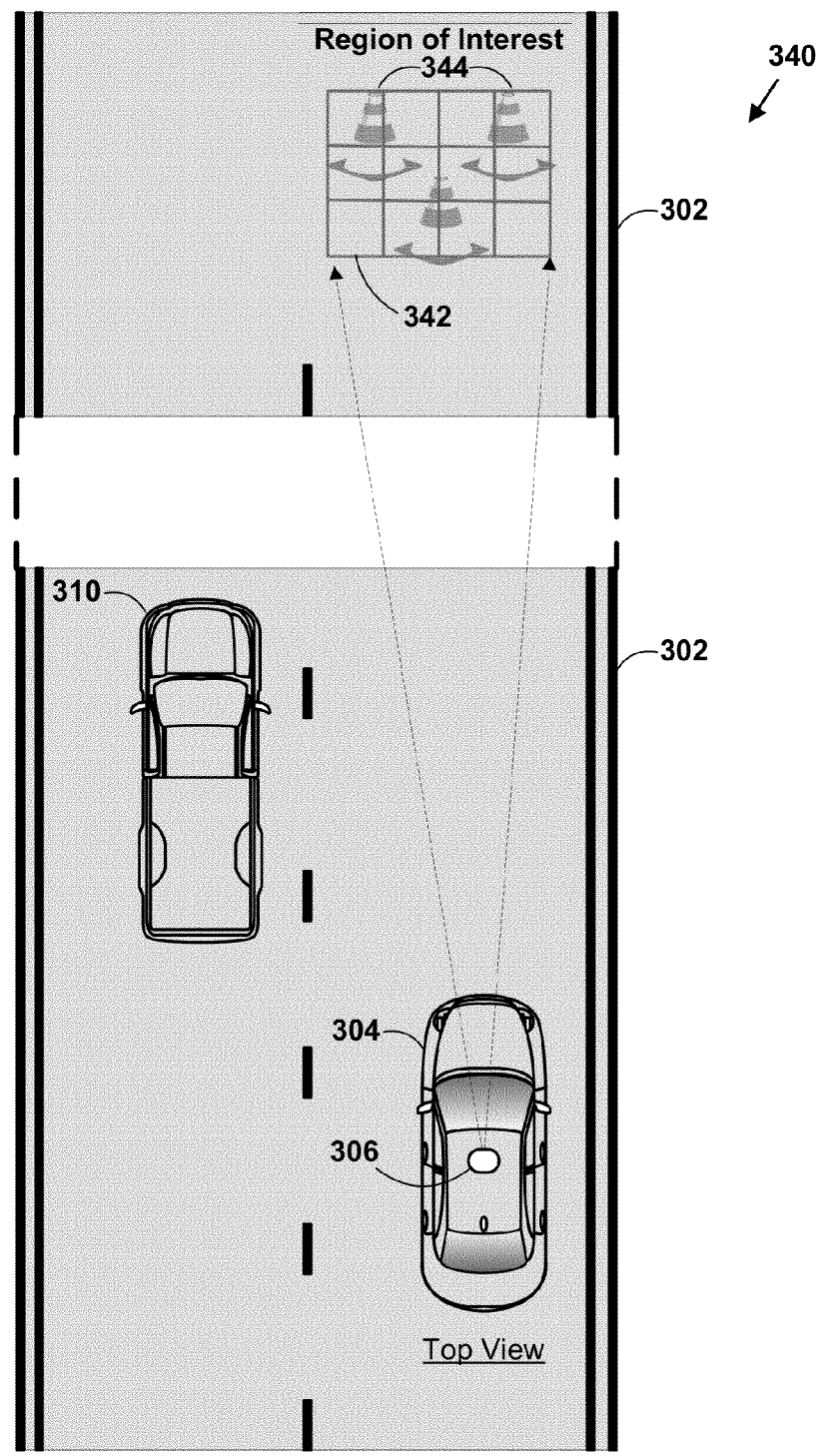
FIG. 3E is another top view of an autonomous vehicle operating scenario, in accordance with an example embodiment.
Figure 3F:
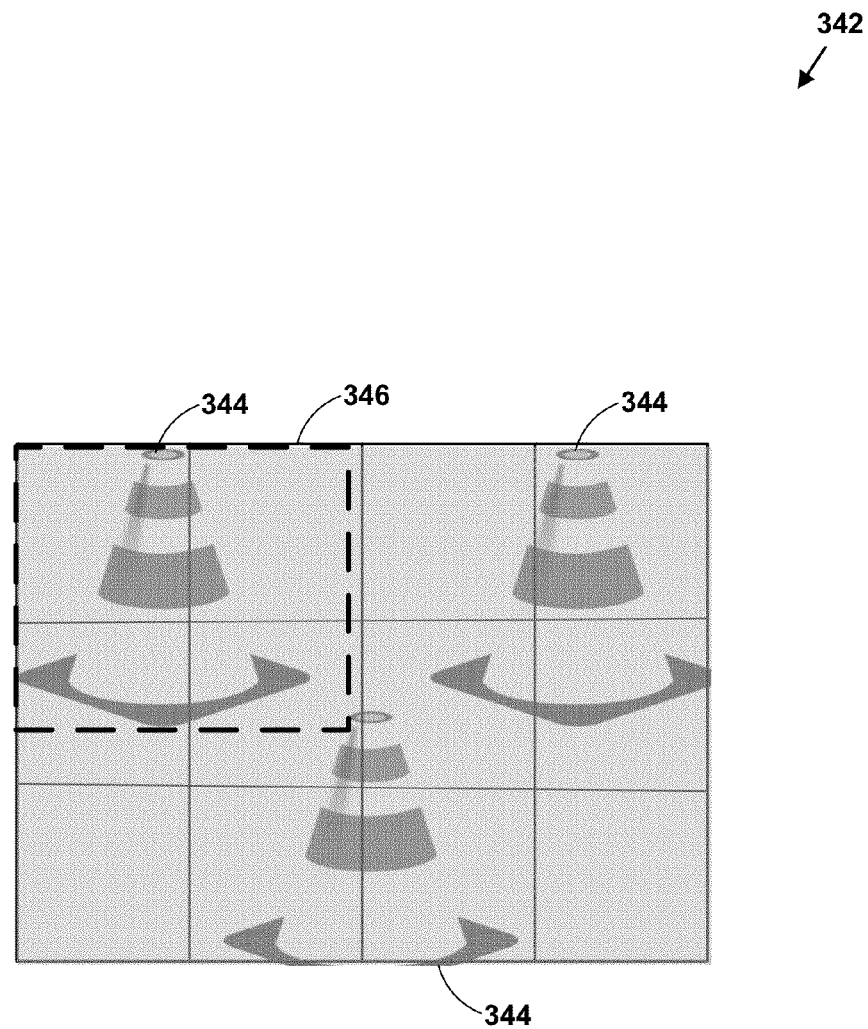
FIG. 3F is a schematic illustration of example image data obtained by the autonomous vehicle of FIG. 3E.

FIG. 3E illustrates a similar scenario 340 to that of FIG. 3A, but later in time, and in this scenario, vehicle 304 may obtain new image data. In scenario 340, vehicle 304 may still be operating in an autonomous mode on road 302. In addition to vehicle 304 and road 302, the environment may include truck 310. In this example, truck 310 may have advanced past vehicle 302, and both truck 310 and vehicle 304 may have passed obstacle 308 (shown in FIG. 3A). As vehicle 304 continues to operate, it may capture new image data 342. In this scenario image data 342 may include data representing unknown objects 344 that are positioned at a farther distance away from the vehicle 304 than the unknown object 308 of scenario 300 (shown in FIG. 3A). FIG. 3F schematically illustrates image data 342 that may be obtained by vehicle 304, and that corresponds to scenario 340. As shown, image data 342 may contain a portion of road 302 as well as a portion 346 of unknown objects 344.

In this scenario, vehicle 304 may compare the information indicative of the appearance of the known structure, previously obtained, during operation in scenario 300, with the information indicative of the appearance of the unknown object to determine whether the information indicative of the appearance of the known structure and the information indicative of the appearance of the unknown object is representative of the same. The comparison may be made in any manner described above or otherwise described herein. Based on the comparison, the vehicle 304 may determine the presence of unknown objects 344, and may, for example, be controlled to avoid unknown objects 344 by changing lanes.

Note, for illustrative purposes, scenarios 300, 320, and 340 illustrated in FIGS. 3A, 3C and 3E are described in the two-dimensional x-y plane. However, it is noted that more complete three-dimensional image data may be obtained by either adjusting a camera of sensor unit 306 of vehicle 304 up or down from the x-y plane.

Figure 4A:
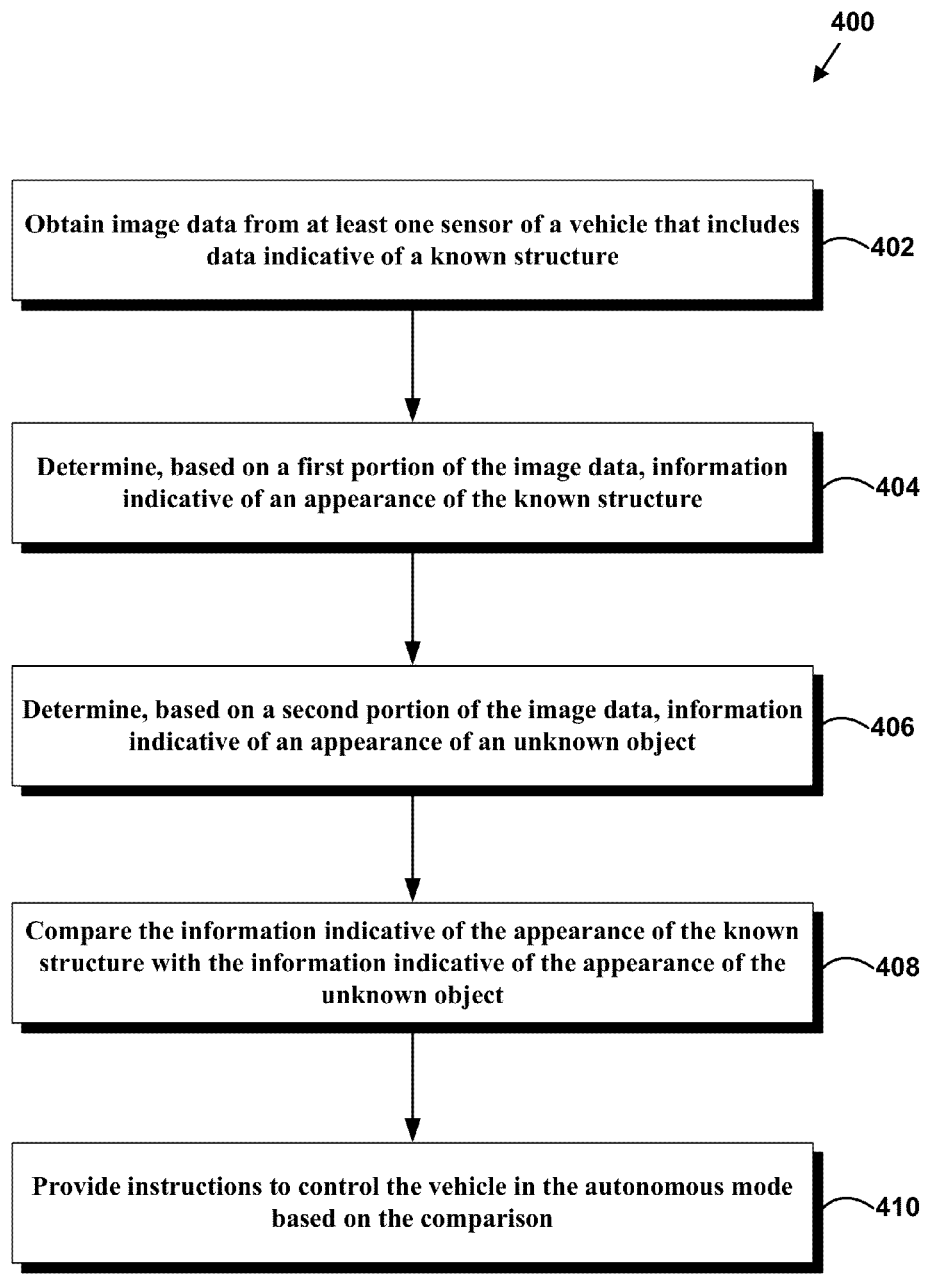
FIG. 4A illustrates a block diagram of a method, in accordance with an example embodiment.

In FIG. 4A, a method 400 is provided for object detection based on known structures of an environment for an autonomous vehicle. The vehicle described in this method may be vehicle 100 and/or vehicle 200 as illustrated and described in reference to FIGS. 1 and 2, respectively. For example, the processes described herein may be carried out by the camera 130 mounted to an autonomous vehicle (e.g., vehicle 200) in communication with the computer system 112, the sensor fusion algorithm 138, and/or the computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 4. Where used, program code can be stored on any type of computer-readable medium (e.g., computer-readable storage medium or non-transitory media, such as the data storage 114 described above with respect to the computer system 112 and/or a computer program product 500 described below), for example, such as a storage device including a disk or hard drive.

In addition, each block of the flowchart shown in FIG. 4A (or FIG. 4B) may represent circuitry that is wired to perform the specific logical functions in the process. Unless specifically indicated, functions in the flowchart shown in FIGS. 4A-4B may be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure, such as the additional flowchart shown in FIG. 4B.

Initially at block 402, method 400 of FIG. 4A includes obtain image data from at least one sensor of a vehicle that includes data indicative of a known structure. The vehicle may be the vehicle described in reference to FIGS. 1 and 2 and may be configured to operate in an autonomous mode in an environment. The sensor may be coupled to the vehicle in a manner similar to or the same as that discussed with reference to FIG. 2, and may include, for example, camera 130 of sensor system 104 of FIG. 1. Any sensor may be used that is capable of obtaining image data. The environment may be any environment in which the vehicle may operate autonomously such as the environments described with reference to FIGS. 3A, 3C, and 3E. Other environments are possible as well.

The known structure may be any structure that the vehicle is traveling on such as a road or a bridge. To obtain image data of the known structure, the vehicle may, for example, determine a location of the known structure, and obtain the image data based on the location. For example, the vehicle, may know where the road is in relation to itself, and what lane the vehicle is traveling in on the road. For example, the vehicle may know that the road is directly in front of it for at least 2 feet before being obstructed (e.g., by the presence of another vehicle). Accordingly, to obtain the image data, the vehicle may operate a camera to obtain image data indicative of the road based on the known information. In other words, the vehicle may operate a camera to ensure it obtains image data within the 2 feet constraint thereby ensuring image data of the known structure is obtained. This may allow the vehicle to ensure the image data accurately reflects the known structure.

The image data may comprise a digital photograph or a digital graphic. In other examples, the image data may include any data format capable of organizing and storing a photographic image and/or graphic image as a digital file, may encompass various types of data, may be of various file formats, and may be stored to various mediums, whether those types of data, file formats, and mediums are known or have yet to be developed.

Block 404 includes determine, based on a first portion of the image data, information indicative of an appearance of the known structure. The first portion of the image data may be determined, for example, by mapping the obtained image data to the environment and using the location information corresponding to the known structure to determine its corresponding location in the image data.

The information indicative of the known structure may be determined by computing statistics on, for example, pixels that define the known structure in the image data. Such statistics may include, for example, calculating color distributions such as a Gaussian distribution, a multivariate Gaussian distribution, or a multi-modal distribution. In other examples, image histograms may be determined that represent the tonal distribution of the image or image data. In further examples, a range of color values may be calculated that define a region of the image data. In yet further examples, a relationship between neighbouring pixels in the image data may be determined by calculating, for example, Directed Graph models that represent the image data. In yet even further examples, models trained using machine learning may be used, such as classifiers, decision trees, or neutral networks. Any technique may be used to model the distribution of image data, and in some examples, the computation of the statistical information may be performed using a computer system of the vehicle in real time.

Example information that may be extracted from the computed statistics may include any information that helps define an appearance of the known structure. For example, the information may comprise one or more of color average, color-intensity, shadow presence, variation of color-intensity, or variation of color. Other information may be included as well.

At block 406, method 400 includes determine, based on a second portion of the image data, information indicative of an appearance of an unknown object. The second image data may be different than the image data obtained in step 402. The second portion of the image data may be determined in the same manner as that of the first portion. By mapping the image data to the environment, the second portion of the image data may be any image data that was not determined to be within the constraints of the location information of the known structure. In other words, the second portion of the image data may be any part of the image data of which the vehicle is not certain is the known structure.

The unknown object may be any object in the environment of the vehicle, but may be unknown to the vehicle. Example unknown objects may be obstacles (e.g., cones, wreckage, etc.), other vehicles, or pedestrians to name a few. The information indicative of an appearance of the unknown object may be determined in the same manner as discussed above with regard to determining information indicative of an appearance of the known structure, at step 404.

At block 408, method 400 includes compare the information indicative of the appearance of the known structure with the information indicative of the appearance of the unknown object. The comparison may be made to determine is the information indicative of the appearance of the known structure with the information indicative of the appearance of the unknown object is representative of the same. To perform the comparison, the vehicle or computing device may determine a portion of the image data indicative of an unknown object and may compare it to the portion of the image data that includes the known structure.

The comparison may include, for example, comparing one or more variables including color average, color-intensity, shadow presence, variation of color-intensity, or variation of color of the known structure with one or more of color average, color-intensity, shadow presence, variation of color-intensity, or variation of color of the unknown object. In other examples, any other known or standard image processing feature descriptors may be used to describe the known area. Such examples may include corner detectors, edge detectors, blob detectors, ridge detectors, gradient detectors, etc. In practice, the distributions defining the known structure and the unknown structure may be computed, and from the distributions such variables may be determined and compared. For example, Gaussian distributions may be calculated that represent the pixels that define the color-intensity of the known structure and may be compared to Gaussian distributions representing pixels in the image data that define color-intensity of the unknown object to determine a likeness of the pixels. Any of the above-noted variables may be defined as a distribution and used in the comparison.

Once the comparison has been made, as block 410, method 400 includes provide instructions to control the vehicle in the autonomous mode based on the comparison. The vehicle may, for example, be controlled to avoid obstacles or vehicles that may be stopped in the current lane of the vehicle. In some examples, once the information indicative of the appearance of the known structure and the unknown object have been determined, the comparison may be made automatically, for example, using a computer system such as computer system 112. In other examples, the comparison may be processed external to the vehicle and provided to the vehicle upon completion.

Figure 4B:
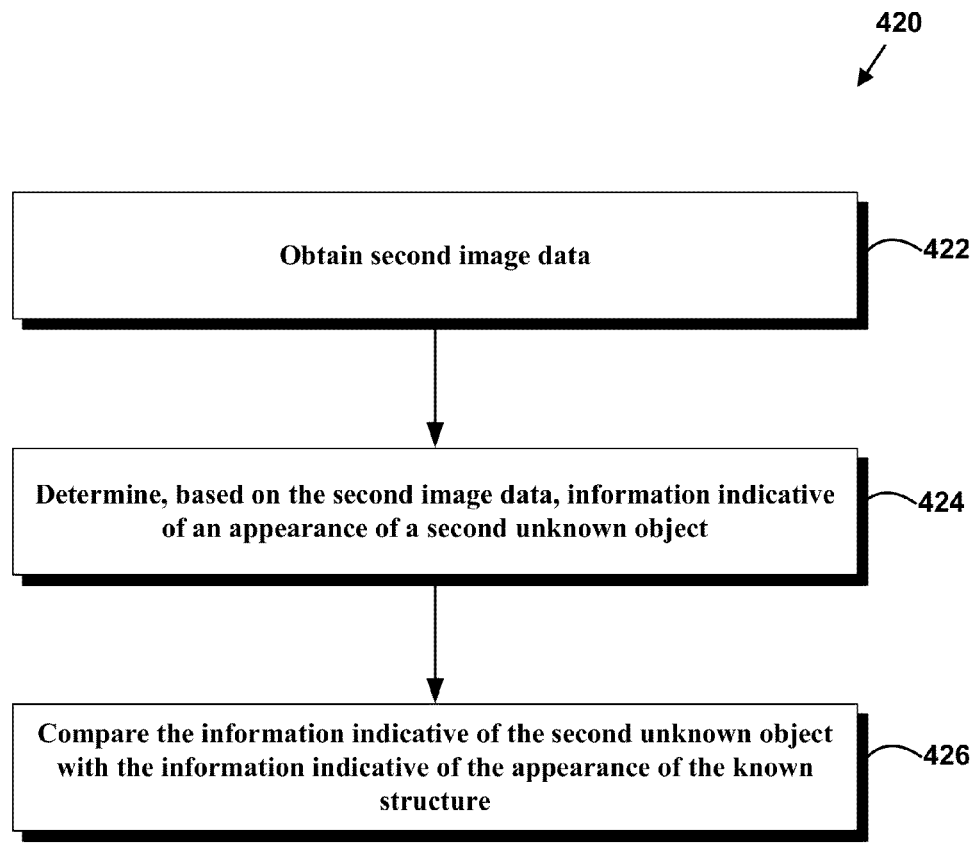
FIG. 4B illustrates another block diagram of a method, in accordance with an example embodiment.

FIG. 4B illustrates another method 420 that may be used to detect objects based on known structures of an environment. Initially, at block 422, method 420 includes obtain second image data. The second image data may be image data that is additional to the image data obtained at step 402 in method 400. For example, the second image data may be obtained from a different region of interest in the environment the vehicle is less certain of. For example, as the vehicle operates it may periodically obtain image data at longer ranges to ensure no obstacles are present. In other examples, the vehicle may use another sensor and detect an object without knowledge as to what it is. Upon detecting the object, the vehicle may obtain the second image data. The vehicle may determine the second image data in other ways as well, and the second image data may be image data in the environment that the vehicle would like to compare to the image data indicative of the known structure. The second image data may be obtained in the same manner as that of the originally obtained image data, noted above with regard to step 402.

At block 424, method 420 includes determine, based on the second image data, information indicative of an appearance of a second unknown object. The second unknown object may be any of the objects discussed above with regard to step 406, and the information indicative of the appearance of the second unknown object may be any of the information discussed above.

At block 426, method 420 includes compare the information indicative of the appearance of the second unknown object in the environment with the information indicative of the appearance of the known structure. The information indicative of the second unknown object may be compared with the information indicative of the appearance of the known structure in the same manner as noted above.

Example methods, such as method 400 of FIG. 4A or method 420 of FIG. 4B may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
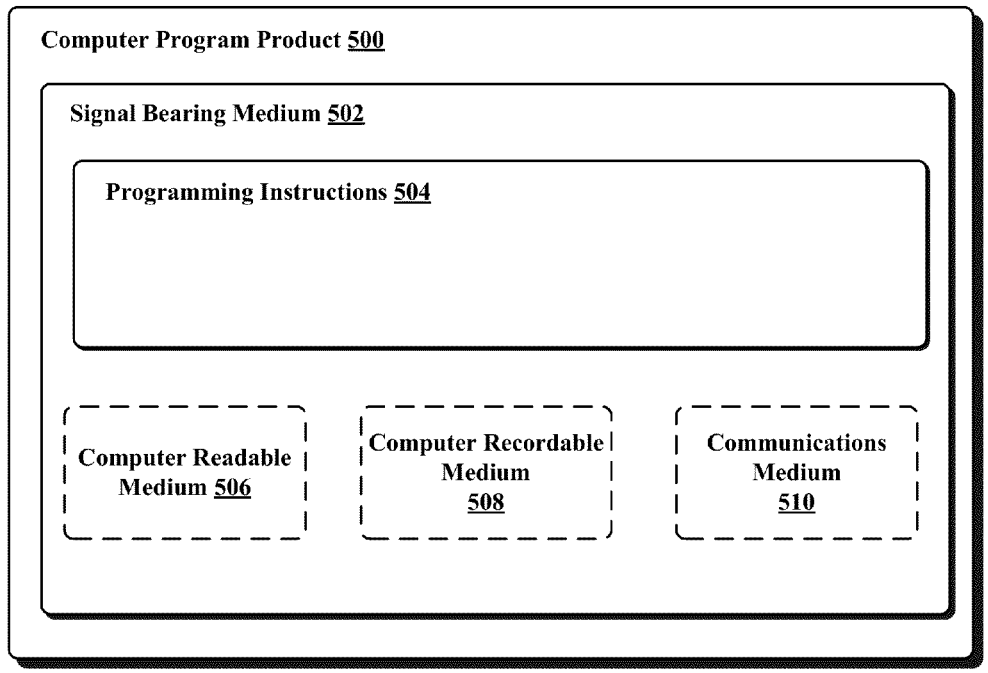
FIG. 5 is a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A method comprising:
obtaining, by a computer system, image data from at least one sensor of a vehicle configured to operate in an autonomous mode in an environment, wherein the at least one sensor is coupled to the vehicle, and wherein the image data includes data indicative of a known structure on which the vehicle is traveling;

determining, based on a first portion of the image data, information indicative of an appearance of the known structure in the environment;

determining, based on a second portion of the image data, information indicative of an appearance of an unknown object in the environment, wherein the second portion of the image data is different than the first portion of the image data;

comparing the information indicative of the appearance of the known structure in the environment with the information indicative of the appearance of the unknown object in the environment so as to determine whether the unknown object is part of the known structure; and providing, by the computer system, instructions to control the vehicle in the autonomous mode based on the comparison.

2. The method of claim 1, wherein the known structure comprises a road or a bridge.

3. The method of claim 1, wherein obtaining the image data from the at least one sensor of the vehicle comprises:

determining a location of the known structure in the environment; and causing the at least one sensor to obtain the image data based on the location.

4. The method of claim 1, wherein the information indicative of the appearance of the known structure comprises one or more of a first color average, a first color-intensity, a first shadow presence, a first variation of color-intensity, or a first variation of color, and wherein the information indicative of the appearance of the unknown structure comprises one or more of a second color average, a second color-intensity, a second shadow presence, a second variation of color-intensity, or a second variation of color.

5. The method of claim 4, wherein comparing the information indicative of the appearance of the known structure in the environment with the information indicative of the appearance of the unknown object in the environment so as to determine whether the unknown object is part of the known structure comprises:

comparing one or more of the first color average, the first color-intensity, the first shadow presence, the first variation of color-intensity, or the first variation of color with one or more of the second color average, the second color-intensity, the second shadow presence, the second variation of color-intensity, or the second variation of color.

6. The method of claim 5, further comprising:

obtaining second image data, wherein the second image data is different than the first image data;

determining, based on the second image data, information indicative of an appearance of a second unknown object in the environment, wherein the information indicative of the second unknown object comprises one or more of a third color average, a third color-intensity, a third shadow presence, a third variation of color-intensity, or a third variation of color; and comparing the information indicative of the appearance of the second unknown object in the environment with the information indicative of the appearance of the known structure so as to determine whether the second unknown object is part of the known structure.

7. The method of claim 6, wherein comparing the information indicative of the appearance of the second unknown object in the environment with the information indicative of the appearance of the known structure so as to determine whether the second unknown object part of the known structure comprises:

comparing one or more of the first color average, the first color-intensity, the first shadow presence, the first variation of color-intensity, or the first variation of color with one or more of the third color average, the third color-intensity, the third shadow presence, the third variation of color-intensity, or the third variation of color.

8. A vehicle comprising:

a sensor configured to obtain image data in an environment, wherein the image data includes data indicative of a known structure on which the vehicle is traveling, and wherein the vehicle is configured to operate in an autonomous mode in the environment; and a computer system, wherein the computer system is configured to:

determine, based on a first portion of the image data, information indicative of an appearance of the known structure in the environment;

determine, based on a second portion of the image data, information indicative of an appearance of an unknown object in the environment, wherein the second portion of the image data is different than the first portion of the image data;

compare the information indicative of the appearance of the known structure in the environment with the information indicative of the appearance of the unknown object in the environment so as to determine whether the unknown object is part of the known structure; and provide instructions to control the vehicle in the autonomous mode based on the comparison.

9. The vehicle of claim 8, wherein the known structure comprises a road or a bridge.

10. The vehicle of claim 8, wherein the computer system is further configured to:

determine a location of the known structure in the environment; and cause the sensor to obtain the image data based on the location.

11. The vehicle of claim 8, wherein the information indicative of the appearance of the known structure comprises one or more of a first color average, a first color-intensity, a first shadow presence, a first variation of color-intensity, or a first variation of color, and wherein the information indicative of the appearance of the unknown structure comprises one or more of a second color average, a second color-intensity, a second shadow presence, a second variation of color-intensity, or a second variation of color.

12. The vehicle of claim 11, wherein the computer system is configured to:

compare one or more of the first color average, the first color-intensity, the first shadow presence, the first variation of color-intensity, or the first variation of color with one or more of the second color average, the second color-intensity, the second shadow presence, the second variation of color-intensity, or the second variation of color.

13. The vehicle of claim 12, wherein the computer system is further configured to:

obtain second image data, wherein the second image data is different than the first image data;

determine, based on the second image data, information indicative of an appearance of a second unknown object in the environment, wherein the information indicative of the second unknown object comprises one or more of a third color average, a third color-intensity, a third shadow presence, a third variation of color-intensity, or a third variation of color; and compare the information indicative of the appearance of second unknown object with the information indicative of the appearance of the known structure so as to determine whether the second unknown object is part of the known structure.

14. The vehicle of claim 13, wherein the computer system is further configured to compare one or more of the first color average, the first color-intensity, the first shadow presence, the first variation of color-intensity, or the first variation of color with one or more of the third color average, the third color-intensity, the third shadow presence, the third variation of color-intensity, or the third variation of color.

15. A non-transitory computer readable medium having stored therein instructions that when executed by a computer system in a vehicle, cause the computer system to perform functions comprising:

obtaining image data from at least one sensor of the vehicle that is configured to operate in an autonomous mode in an environment, wherein the at least one sensor is coupled to the vehicle, and wherein the image data includes data indicative of a known structure on which the vehicle is traveling;

determining, based on a first portion of the image data, information indicative of an appearance of the known structure in the environment;

determining, based on a second portion of the image data, information indicative of an appearance of an unknown object in the environment, wherein the second portion of the image data is different than the first portion of the image data;

comparing the information indicative of the appearance of the known structure in the environment with the information indicative of the appearance of the unknown object in the environment so as to determine whether the unknown object is part of the known structure; and providing instructions to control the vehicle in the autonomous mode based on the comparison.

16. The non-transitory computer readable medium of claim 15, wherein the known structure comprises a road or a bridge.

17. The non-transitory computer readable medium of claim 15, wherein the instructions are further executable by the computer system in the vehicle to cause the computer system to perform functions comprising:

determining a location of the known structure in the environment; and causing the at least one sensor to obtain the image data based on the location.

18. The non-transitory computer readable medium of claim 15, wherein the information indicative of the appearance of the known structure comprises one or more of a first color average, a first color-intensity, a first shadow presence, a first variation of color-intensity, or a first variation of color, and wherein the information indicative of the appearance of the unknown structure comprises one or more of a second color average, a second color-intensity, a second shadow presence, a second variation of color-intensity, or a second variation of color.

19. The non-transitory computer readable medium of claim 18, wherein the instructions are further executable by the computer system in the vehicle to cause the computer system to perform functions comprising:

comparing one or more of the first color average, the first color-intensity, the first shadow presence, the first variation of color-intensity, or the first variation of color with one or more of the second color average, the second color-intensity, the second shadow presence, the second variation of color-intensity, or the second variation of color.

20. The non-transitory computer readable medium of claim 19, wherein the instructions are further executable by the computer system in the vehicle to cause the computer system to perform functions comprising:

obtaining second image data, wherein the second image data is different than the first image data;

determining, based on the second image data, information indicative of an appearance of a second unknown object in the environment, wherein the information indicative of the second unknown object comprises one or more of a third color average, a third color-intensity, a third shadow presence, a third variation of color-intensity, or a third variation of color; and comparing the information indicative of the appearance of the second unknown object with the information indicative of the appearance of the known structure so as to determine whether the second unknown object is part of the known structure.

* * * * *